US009969568B2

(12) United States Patent
Nguyen et al.

(10) Patent No.: US 9,969,568 B2
(45) Date of Patent: May 15, 2018

(54) SYSTEMS AND METHODS FOR PNEUMATIC TUBE DELIVERY USING MULTIPLE SUBSYSTEMS (71) Applicant: Pevco Systems International Inc., Baltimore, MD (US)

(72) Inventors: Namquoc Nguyen, Baltimore, MD (US); William Powder, Baltimore, MD (US)

(73) Assignee: PEVCO SYSTEMS INTERNATIONAL INC., Baltimore, MD (US)

( * ) Notice: Subject to any disclaimer, the term of this patent is extended or adjusted under 35 U.S.C. 154(b) by 0 days. days.

(21) Appl. No.: 15/191,037

(22) Filed: Jun. 23, 2016

(65) Prior Publication Data
US 2017/0369256 A1 Dec. 28, 2017

(51) Int. Cl.
*B65G 51/36* (2006.01)
*B65G 51/46* (2006.01)
*B65G 51/26* (2006.01)
*B65G 51/24* (2006.01)

(52) U.S. Cl.
CPC ............ *B65G 51/46* (2013.01); *B65G 51/24* (2013.01); *B65G 51/26* (2013.01)

(58) Field of Classification Search
USPC ........................................................ 406/1, 2
See application file for complete search history.

(56) References Cited

U.S. PATENT DOCUMENTS

| | | | | | |
|---|---|---|---|---|---|
| 2,815,183 | A | * | 12/1957 | Hauer | B65G 51/46 406/3 |
| 4,058,274 | A | * | 11/1977 | Hochradel | B65G 51/40 406/2 |
| 4,529,335 | A | * | 7/1985 | Hilbert | B65G 51/32 406/1 |
| 6,659,693 | B1 | * | 12/2003 | Perkins | B65G 51/24 406/13 |
| 7,243,002 | B1 | * | 7/2007 | Hoganson | B65G 51/44 406/4 |
| 7,424,340 | B2 | * | 9/2008 | Owens | B65G 51/46 406/182 |
| 8,565,915 | B2 | * | 10/2013 | Dillon | G06Q 10/047 700/224 |

(Continued)

Primary Examiner — William R Harp
(74) Attorney, Agent, or Firm — Fay Kaplun & Marcin, LLP (57) ABSTRACT A method for delivering items in a pneumatic delivery system includes receiving delivery information corresponding to an item to be delivered from a first workstation of a plurality of workstations to a second one of the workstations, configuring a first one of a plurality of blowers and a corresponding workstation diverter corresponding to the first workstation to create a path from the first workstation to the first blower, operating the first blower to generate suction drawing the item to the first blower, configuring a subset of the plurality of diverters of the system to create a continuous path from the first blower to the second workstation and routing, when the first and second workstations are in separate subsystems of the pneumatic delivery system, the item through an inter-subsystem exchange unit so that the item is delivered to the second workstation using only the first blower.

20 Claims, 7 Drawing Sheets (56) References Cited

U.S. PATENT DOCUMENTS

| | | | | |
|---|---|---|---|---|
| 8,641,329 B2* | 2/2014 | Barrios | ................. | B65G 51/14 |
| | | | | 137/875 |
| 8,721,231 B2* | 5/2014 | Barrios | ................. | B65G 43/00 |
| | | | | 406/11 |
| 8,793,014 B2* | 7/2014 | Hoganson | .............. | G06Q 10/08 |
| | | | | 700/228 |

* cited by examiner

SYSTEMS AND METHODS FOR PNEUMATIC TUBE DELIVERY USING MULTIPLE SUBSYSTEMS

FIELD OF THE INVENTION

The present invention is generally directed to a pneumatic tube delivery system having multiple connected subsystems. More specifically, the subject system safely, securely, and timely transports various items through tubular conduits of a pneumatic tube delivery system including multiple subsystems while maintaining intelligent management and control over delivery adaptively suited to transported items.

BACKGROUND

Pneumatic tube delivery systems are widely used in various institutions. Although, these systems are implemented in different forms depending on the nature of operations and transactions carried out at various facilities, the systems generally share basic components. First, a network of tubular conduits is established throughout the facility, branching to outlets connected to respective send/receive workstations, or portals. Items of interest may be transported between user workstations via the conduits in capsule-like carriers, the contents of which are filled, for example, by users at sending workstations and emptied by users at receiving workstations. Alternatively, the packaging of the item itself may act as the carrier so that the item is not required to be housed within a separate carrier apparatus for delivery. The carriers' travel through the network of conduits is driven by one or more blower units which generate pneumatic flow (such as by positive and vacuum pressures) sufficient to propel the carriers through different portions of the network. Typically, a computer-based controller unit(s) operates to regulate carrier traffic and maintain overall system operation.

The network of conduits may be quite complex even in modest sized facilities, since delivery access between every combination of workstations is often required. The network generally incorporates multi-port diverters, or transfer units, at intermediate points physically transferring carriers from one branch (or section) of the conduit network to another for delivery to the proper destination outlet. While such diverter/transfer units markedly reduce redundancy in conduit segments, the network remains quite elaborate in systems serving numerous outlets, with individual conduit segments making numerous turns and bends to serve the many workstations.

Pneumatic tube delivery systems are employed, for example, in financial institutions such as banks to remotely conduct customer transactions in real time. Industrial and retail facilities also employ these systems to transport payload items such as documents, currency, parts, or merchandise from one location to another. Perhaps the most prevalent and demanding uses are in healthcare institutions such as hospitals, where the need for quick, efficient and secure transport of physical items between remote locations within a large facility, or multiple facilities, tends to be the rule, not the exception. Items such as pharmaceuticals, lab specimens, blood products, and the like must be passed between different staff members quickly and reliably. It is not uncommon for a hospital to carry out several thousands of transports of delicate payloads like this on a daily basis.

In healthcare settings, items such as blood work and other test results, may be highly time sensitive. However, the size of certain healthcare facilities, the number of required workstations often push the limits of typical pneumatic tube delivery system. In current systems that include large numbers of workstations arranged in multiple operating subsystems, transporting a single carrier may require the operation of multiple blowers before a carrier can reach its destination. All of this increases the time and energy required to achieve delivery, reducing the throughput and efficiency of the entire system. Hence, there is a need for a delivery routing system that permits delivery to a large number of workstations arranged throughout multiple subsystems while reducing delivery time and increasing efficiency.

SUMMARY OF THE INVENTION

The present invention is directed to a method for transporting items via a multiple subsystem delivery system, wherein the multiple subsystem delivery system includes a plurality of workstations, a plurality of subsystem diverters (within a subsystem), a plurality of inter-subsystem diverters (connecting multiple subsystems), and a blower. The method includes receiving delivery information (e.g., a destination workstation, urgency data, carrier contents, etc.) related to transporting a carrier from a sending workstation of a first subsystem in a multiple subsystem delivery system, wherein the multiple subsystem delivery system includes a plurality of workstations, a plurality of subsystem diverters, a plurality of inter-subsystem diverters, and at least a first blower. The method further includes configuring a first subsystem diverter of the first subsystem and a first inter-subsystem diverter based on the delivery information from the sending workstation. The method further includes operating the first blower to transfer the carrier using vacuum in a first direction from the sending workstation toward the first blower. The method further includes operating the first blower to transfer the carrier using pressure in a second direction from the first blower toward a destination workstation.

The present invention is also directed to a pneumatic tube delivery system for transporting items. The system includes a plurality of workstations within the pneumatic tube delivery system including multiple subsystems. A blower in a first subsystem is operable to transfer a carrier from a sending workstation in a first direction (toward the blower) using vacuum and then to move the carrier in a second direction (away from the blower) toward a destination workstation using positive pressure. A first subsystem diverter includes a plurality of outlet tubes which couple the blower of the first subsystem to all of the workstations of the first subsystem. A subsystem diverter in the first subsystem couples the first subsystem diverter to diverters associated with other subsystems. That is, each subsystem is defined as a group of blowers and diverters which permit carriers to pass from any workstation in the subsystem to any other workstation of the subsystem without passing through an inter-subsystem diverter as will be described in more detail below. Each additional subsystem includes one or more respective blowers, workstations and subsystem diverters arranged as described in regard to the first subsystem and is connected to the first subsystem and all other subsystems via one or more inter-subsystem diverters. The subsystem diverters and inter-subsystem diverters are arranged (as will be described in more detail below) so that a single blower can propel a carrier from any workstation in any subsystem to any desired destination workstation in any subsystem without requiring the operation of any of the other blower. A controller receives delivery information (e.g., a destination workstation, urgency data, etc.) relating to a particular carrier (e.g., from the sending workstation) and configures all of the diverters as necessary along a path determined by the controller and the corresponding blower to propel the carrier to the destination workstation.

The present invention is also directed to a non-transitory computer readable storage medium including a set of instructions, executable by a processor, for controlling the operations of a pneumatic tube delivery system. The set of instructions, when executed by the processor, cause the processor to perform operations including receiving delivery information from a sending workstation of a first subsystem in a multiple subsystem delivery system (including a plurality of workstations, a plurality of subsystem diverters, a plurality of inter-subsystem diverters, and at least a first blower). The set of instructions cause the processor to determine a path to the destination workstation via a selected one of the blowers (e.g., the first blower) and to configure all of the diverters along the portion of the path leading to the first blower as necessary. The set of instructions then causes the processor to control the first blower to apply vacuum pressure to draw the carrier through the first portion of the path to the first blower. The set of instructions then causes the processor to configure all of the diverters as necessary along the second part of the path from the first blower to the destination workstation and then operates the first blower to apply positive pressure to propel the carrier through the second part of the path to the destination workstation.

DETAILED DESCRIPTION

The present invention may be further understood with reference to the following description and the appended drawings, wherein like elements are referred to with the same reference numerals. Exemplary embodiments describe pneumatic tube delivery systems and methods for improved performance pertaining to payload items to be transported through pneumatic conduits extending between workstations organized into subsystems, with each subsystem including a plurality of zones and each zone including a plurality of workstations. The exemplary system and method may be implemented within a large facility divided into a number of subsystems and their individual zones as desired. For instance, the large facility may be a healthcare complex composed of separate buildings distributed across a large plot of land. According to this example, each of the buildings within the complex may define one or more subsystems. Although the exemplary embodiments describe the use of a pneumatic tube delivery system within a healthcare complex, it will be understood by those of skill in the art that the disclosed systems and methods may be used in any of a variety of locations.

As will be described in greater detail below, the exemplary systems and methods allow for a multiple subsystem pneumatic tube delivery system to complete delivery of each carrier through the system from any sending workstation to any receiving workstation using only a single blower per delivery. The configuration of diverters described herein and their arrangement allow the connection of multiple subsystems without requiring the inter-subsystem blowers found in current systems including multiple subsystems. This reduces delivery time required for the handoff between multiple blowers as employed in prior systems and increases overall system efficiency and throughput. As described below, this arrangement allows the connection of a single path between any two workstations—even in different subsystems—whereby a carrier is drawn from a sending workstation to a blower selected by the system and then pushed through an interzone path all the way to the receiving workstation via the selected blower.

Figure 1:
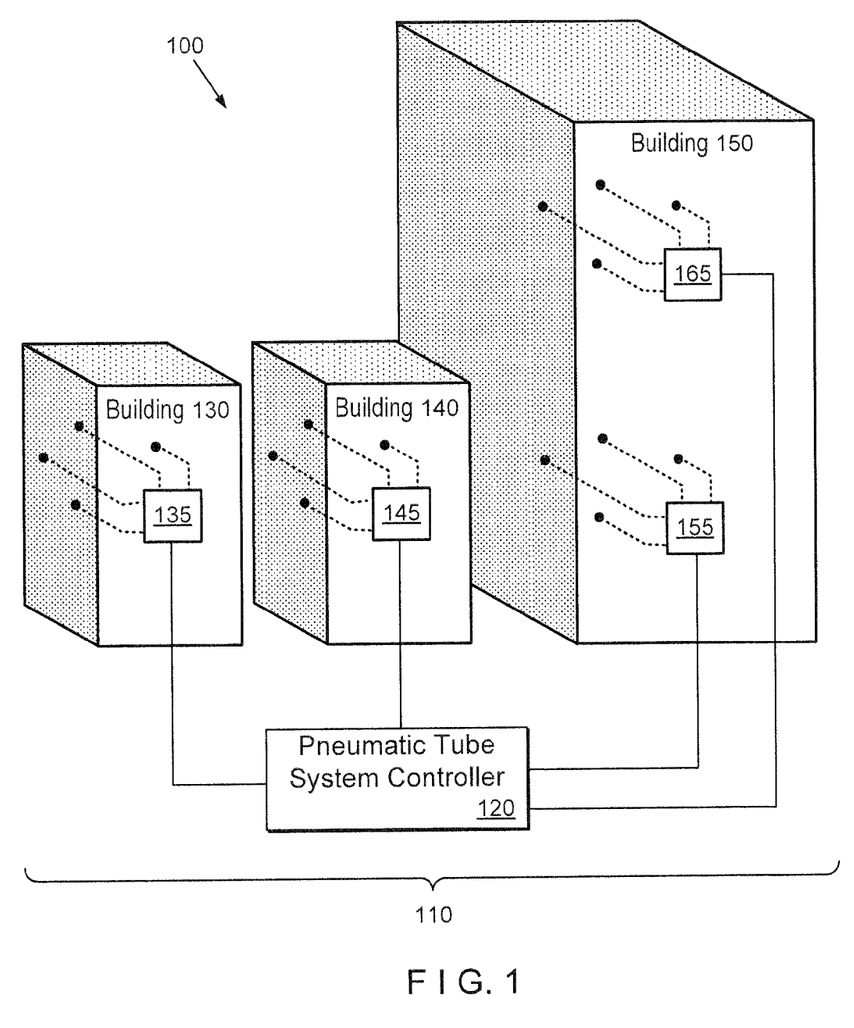
FIG. 1 shows a schematic diagram of a pneumatic tube delivery system implemented within a facility including a plurality of structures according to an exemplary embodiment of the present invention.

FIG. 1 shows a schematic diagram of a pneumatic tube delivery system 100 according to an exemplary embodiment, implemented within a facility including a plurality of structures. The pneumatic tube delivery system 100 of this embodiment is deployed within a facility 100, such as a healthcare facility, that includes multiple structures, such as buildings 130, 140 and 150. Furthermore, each of the buildings 130-150 in this embodiment defines one or more delivery zones, such as subsystem 135 for building 130, subsystem 145 for building 140 and subsystems 155 and 165 for building 150. As indicated above, each of the subsystems 130, 140 and 150 is then divided into zones each of which includes a plurality of workstations.

A system controller 120 of the exemplary pneumatic tube delivery system 100 controls the operation of the overall system 100 and a plurality of subsystems 135-165 throughout the facility.

Each of the subsystems 135-165 includes at least one blower, at least one subsystem diverter, and at least one workstation for sending and receiving carriers. Accordingly, the subsystem 135-165 for each of the subsystems 135-165 is operated by the controller 120 to manage deliveries within its respective subsystem and to interface with other subsystems for any inter-subsystem deliveries. It will be understood by those of skill in the art that while the schematic diagram 100 depicts a facility including three structures and four delivery subsystems, the exemplary system 100 may be implemented in a facility having any number of structures (including a single structure) and any number of delivery subsystems.

The exemplary system controller 120 receives delivery information (e.g., receiving workstation, carrier content information, urgency and/or handling instructions, etc.) corresponding to a carrier originating from a sending workstation of one of the subsystems 135-165. Based on the delivery information and current system conditions (e.g., carrier traffic, preferred routing information, staff alerts, staff access permissions and prohibitions, time of day restrictions, location restrictions, control software graphical user interface messages, error handling preferences, empty carrier handling info, out of order or other relevant status of any system components, etc.), the controller 120 creates a transportation pathway from the sending workstation to a receiving workstation. Based on this information, the controller 120 configures various components throughout the system 100 and the subsystems 135-165, including but not limited to a selected blower, subsystem diverters and inter-subsystem diverters to create a first path from the sending workstation to the selected blower. The controller 120 then operates the selected blower to generate vacuum pressure to draw the carrier from the sending workstation to the selected blower. When the carrier has reached the selected blower, the controller 120 configures various components of the system 100 along a second part of the pathway extending from the selected blower to the receiving workstation and operates the blower to generate positive pressure propelling the carrier to the receiving workstation.

As will be described in greater detail below, the system controller 120 may adaptively set the appropriate transportation route, including blower operation and subsystem/inter-subsystem diverters configurations, based on the delivery information. The transport transaction is then carried out according to the transport characteristic settings, via, for example, a carrier apparatus through the system. In addition, where the information acquired for a payload item indicates that it is highly time-sensitive, for instance, the priority of delivery is appropriately set and the transport transaction carried out as expeditiously as priority level dictates. In addition, the transaction characteristics may indicate additional actions beyond priority level adjustment which are concurrently or collaterally effected by the system 100 as well. These actions may include, for instance, the dissemination of appropriate alerts to one or more parties and locations affected by the transport transaction. It will be understood by those of skill in the art that although the exemplary embodiments describe carriers and carrier apparatuses, the payload items are not required to be separately housed in a carrier apparatus and, in some situations, the packaging of the payload item itself, may act as the carrier.

Figure 2:
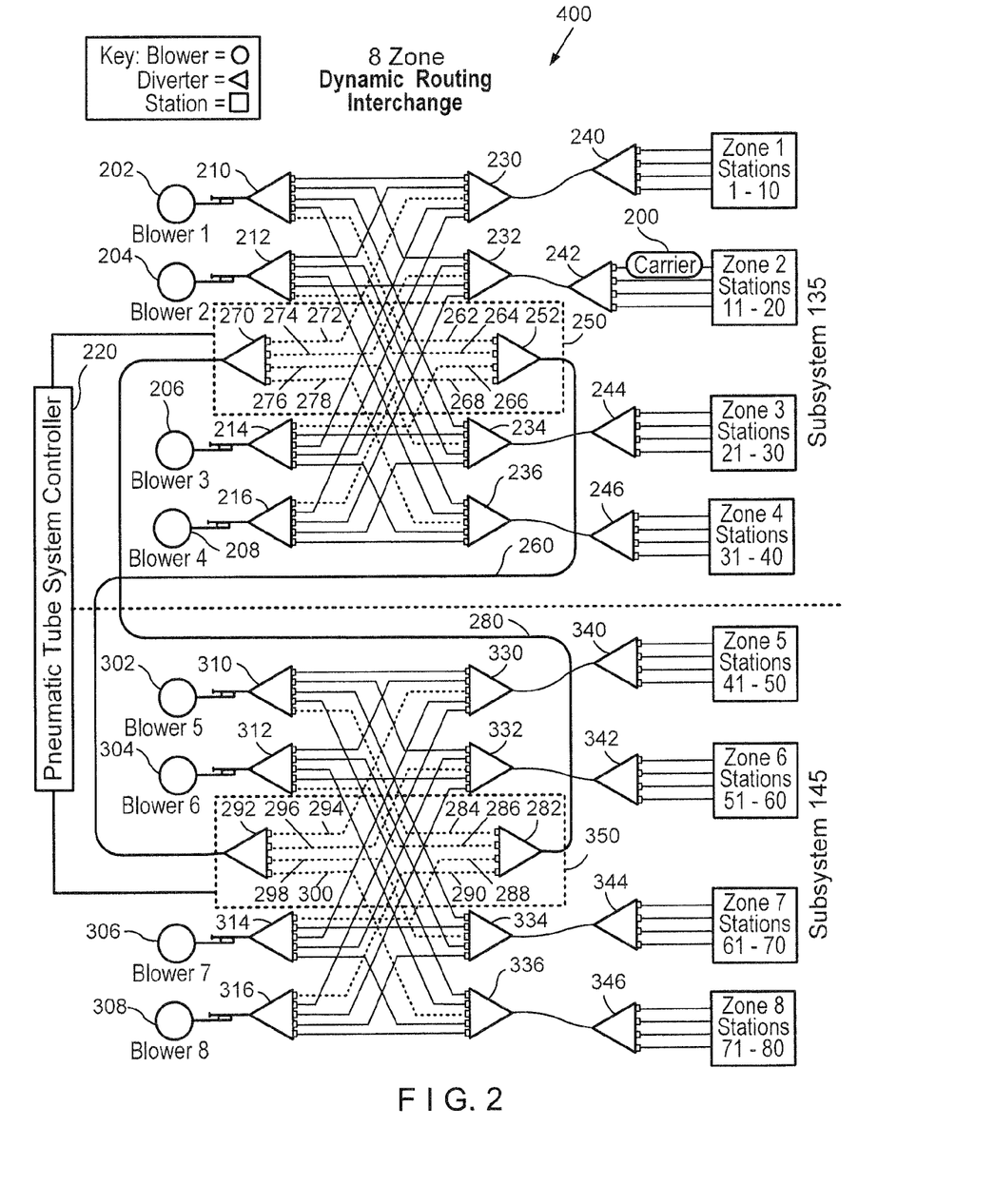
FIG. 2 shows schematic diagram of a multiple subsystem pneumatic tube delivery system according to an exemplary embodiment of the present invention.

FIG. 2 shows simplified schematic diagram of an exemplary pneumatic tube delivery system 400 for delivering a carrier 200 from a first subsystem (e.g., subsystem 135) to a second subsystem (e.g, subsystem 145) according to an exemplary embodiment. As shown in FIG. 2, the pneumatic tube delivery system includes a system controller 220, transmission tubing, a plurality of blowers and diverters, and a plurality of workstations that may server as both sending workstations and receiving workstations for the delivery of a carrier 200.

Those skilled in the art would understand that any number of workstations may be distributed throughout a plurality of zones within each subsystem. For instance, the subsystem 135 may include Zone 1 having workstations 1-10, Zone 2 having workstations 11-20, Zone 3 having workstations 21-30, and Zone 4 having workstations 31-40. The subsystem 145 may include Zone 5 having workstations 41-50, Zone 6 having workstations 51-60, Zone 7 having workstations 61-70, and Zone 8 having workstations 71-80. Although FIG. 2 depicts two delivery subsystems (subsystem 135 and subsystem 145), a system with any number of subsystems and the inclusion of any number of sending and receiving workstations is possible without deviating from the scope of the present principles.

Each of the subsystems 135 and 145 also includes a corresponding plurality of blowers, such as blowers 202, 204, 206 and 208 for subsystem 135 and blowers 302, 304, 306 and 308 for subsystem 145. Any one of the blowers can apply positive or vacuum pressure to move the carrier 200 from any sending workstation to any receiving workstation. Furthermore, each of the subsystems 135 and 145 also includes a variety of diverters to align the transmission tubing to configure a desired path for the carrier 200. As would be understood by those skilled in the art, the diverters throughout the system generally include a single inlet port coupled to a plurality (e.g., 4 or 6) outlet ports so that the diverter may configure a plurality of paths by coupling a desired one of the outlet ports to the inlet port. Those skilled in the art will further understand that the terms "inlet" and "outlet" ports is used to simplify the wording of the application and does not imply a single direction of flow. Carriers may enter or exit every diverter via any of the outlet ports and may enter or exit the diverter via the inlet port. The terms are used to signify only that each diverter has a single ("inlet") port at one side that may be connected to each of a plurality of ports ("outlet") at the other side.

The subsystem 135 includes zone diverters 240, 242, 244, and 246 and the subsystem 145 includes zone diverters 340, 342, 344, and 346 each of which includes tubing extending from each of its outlet ports to a corresponding plurality of workstations. That is, each outlet port of any of the zone diverters may connect directly to a single workstation or, as would be understood by those skilled in the art, any or all of the outlet ports may connect to multiple workstations via additional diverters. For instance, the zone diverter 240 includes a plurality of outlet ports coupled to workstations 1-10 so that a carrier 200 sent from any of these workstations 1-10 passes through a corresponding one of the outlet ports of the diverter 240 to the inlet port thereof to a subsystem diverter 230. The subsystem 135 includes subsystem diverters 230, 232, 234, and 236 each of which includes an inlet port coupled to the inlet port of a corresponding one of the zone diverters 240, 242, 244 and 246. Similarly, the subsystem 145 includes subsystem diverters 330, 332, 334, and 336 each of which includes an inlet port coupled to the inlet port of a corresponding one of the zone diverters 340, 342, 344 and 346. The subsystem diverter 230 includes one outlet port connected an inter-subsystem hub 250 while each of the remaining outlet ports is connected to one of the outlet ports of a corresponding one of the blower diverters 210, 212, 214 and 216. Each of the subsystem diverters 232, 234 and 236 includes a single outlet port coupled to the inter-subsystem hub 250 while the rest of the outlet ports of each of these subsystem diverters is coupled to one of the outlet ports of a respective one of the blower diverters 210, 212, 214 and 216. Similarly, each of the subsystem diverters 330, 332, 334 and 336 includes a single outlet port coupled to an inter-subsystem hub 350 while the rest of the outlet ports of these subsystem diverters are coupled to an outlet port of a respective one of the blower diverters 310, 312, 314 and 316. Blowers 202, 204, 206 and 208 are coupled to the inlet ports of blower diverters 210, 212, 214 and 216, respectively, while blowers 302, 304, 306 and 308 are coupled to the inlet ports of blower diverters 310, 312, 314 and 316, respectively.

The subsystem hubs 250 and 350 are connected to one another and each includes inter-subsystem diverters and tubing to connect all of the diverters within the respective subsystems to one another. For instance, the subsystem hub 250 includes an inter-subsystem diverter 252 with a plurality of outlet ports each of which is coupled to an outlet port of a corresponding one of the blower diverters 210, 212, 214 and 216 while the inlet port of the inter-subsystem diverter 252 is coupled to the inlet port of an inter-subsystem diverter 292 of the inter-subsystem hub 350. The subsystem hub 250 also includes an inter-subsystem diverter 270 with a plurality of outlet ports each of which is coupled to an outlet port of a corresponding one of the subsystem diverters 230, 232, 234 and 236 while the inlet port of the inter-subsystem diverter 270 is coupled to the inlet port of an inter-subsystem diverter 282 of the inter-subsystem hub 350. Similarly, the inter-subsystem diverter 282 of the subsystem hub 350 includes a plurality of outlet ports each of which is coupled to an outlet port of a corresponding one of the blower diverters 310, 312, 314 and 316 while the inlet port of the inter-subsystem diverter 282 is coupled to the inlet port of the inter-subsystem diverter 270. The inter-subsystem diverter 292 includes a plurality of outlet ports each of which is coupled to an outlet port of a corresponding one of the subsystem diverters 330, 332, 334 and 336 while the inlet port of the inter-subsystem diverter 292 is coupled to the inlet port of the inter-subsystem diverter 252.

Specifically, the inter-subsystem diverter 252 of this embodiment features four outlet ports with a tube 262 connecting to blower diverter 210, a tube 264 connecting to the blower diverter 212, a tube 266 connecting to the blower diverter 214, and a tube 268 connecting to the blower diverter 216. On the opposing end of the inter-subsystem hub 250, the inter-subsystem diverter 270 features four outlet ports and tubing wherein tube 272 connects to subsystem diverter 230, tube 274 connects to subsystem diverter 232, tube 276 connects to subsystem diverter 234, and tube 278 connects to subsystem diverter 236.

Likewise, subsystem hub 350 includes two opposite facing inter-subsystem diverters 282 and 292 that interconnect pathways between the blower diverters 310, 312, 314 and 316 and the subsystem diverters 330, 332, 334, and 336. Similarly, inter-subsystem diverter 282 features four outlet ports and tubing wherein tube 284 connects to blower diverter 310, tube 286 connects to blower diverter 312, tube 288 connects to blower diverter 314, and tube 290 connects to blower diverter 316. The inter-subsystem diverter 292 of this embodiment features four outlet ports with a tube 294 connecting to the subsystem diverter 330, a tube 296 connecting to the subsystem diverter 332, a tube 298 connecting to the subsystem diverter 334 and a tube 300 connecting to the subsystem diverter 336.

In addition, the subsystem hubs 250 and 350 are connected to one another via inter-subsystem inlet and outlet tubes 260 and 280. Accordingly, either of the inter-subsystem diverters 252 or 270 of the subsystem hub 250 can direct a carrier 200 from the subsystem 135 to either of the inter-subsystem diverters 282 or 292 of the subsystem hub 350 within the subsystem 145. Thus, a single path may be made between any of the workstations 1-40 of subsystem 135 with any of the blowers 202, 204, 206, 208, 302, 304, 306 and 308. By drawing a first path from any sending workstation to a selected one of the blowers and a second path from the selected blower to the receiving workstation, a single blower may handle any transfer between any two work stations throughout the system 100. Those skilled in the art will understand that this prevents bottle necks that would occur if every interzone transfer depended not only on one of the blowers in an originating subsystem but also on an interzone blower or even simply another blower in another subsystem. It would be understood by those of skill in the art that the pneumatic tube delivery system 100 may include several more components and that FIG. 2 is a simplified depiction of such a system.

The exemplary system controller 220 manages all of the system components (e.g., blowers, diverters, workstations, etc.), carrier traffic, delivery information, statistical information, alarms, alerts, and other forms of communication with personnel. Those skilled in the art will understand that the controller 220 may be formed of one or more computing devices (e.g., arranged in a network and coupled to one another in any known fashion (e.g., wirelessly, through a LAN, via the Internet, etc.). In addition, delivery information and carrier content information may be entered in the system in any known way (e.g., by manual data entry via a user interface, through optical scanning of coded information on carrier and/or content labels, by reading information embedded in chips in carriers and/or carrier contents, etc.).

Each of the diverters is arranged and configured by the system controller 220 (i.e., the controller 220 instructs the diverter to connect its inlet port to a selected output port) throughout the system to configure a desired first path from a sending station to a selected blower and, when the carrier has reached the selected blower, to configure a second path from the selected blower to the receiving workstation. As noted above, the system controller 220 receives delivery information (e.g., a receiving workstation, urgency data, etc.) as well as system information and configures the system (e.g., selects a blower to handle each delivery and a path through the system to achieve delivery goals while maximizing system efficiency and/or throughput. Each workstation may includes a memory, a user interface and a display. The memory (which need not be located at the workstation) may store information related to the item(s) within the carrier 200 and may include a database of information regarding transport characteristics associated with particular items. The user interface, via which a user may input information to initiate a transaction or provide information for facilitating a transaction, may include input devices such as, for example, a keyboard, a mouse, and/or a touch screen on the display or any other suitable input device. In one example, the user interface includes a touch screen or touch control. The display may display information regarding the carrier 200, the item(s), the delivery route, the delivery zones, the subsystems, any general transaction information, etc.

The exemplary system controller 220 may include a processor for determining appropriate actions to be performed within the pneumatic tube delivery system and for receiving analyzing, storing information to system users and administrators. For example, the system controller 220 may use the delivery information to determine to which subsystem and workstation a carrier 200 will be routed. The controller 220 may also determine transport characteristics and payload priorities of each of the carriers 200 to be delivered by the system. For example, where the item within the carrier 200 is identified as a perishable item such as a blood sample that requires particular handling to be completed within a particular time frame, the carrier 200 may be mapped to a transport characteristic identifying the item as a transport priority having a preferred route. Based on the identified transport characteristics, the system controller 220 may determine optimal routing and scheduling of the payload's transports, and order its delivery transactions accordingly relative to other delivery transactions to also be carried out by the system. Transport characteristics such as payload priorities may be determined and suitably indicated in item-specific manner for all or certain ones of the delivery jobs to be carried out through a given pneumatic tube delivery system. The system controller 220 is able to configure the operation of the other components (blowers, diverters, etc.) provide such optimal routing. The system controller 220 may also order other collateral actions to be carried out for the transaction, as determined by information contained in a database preferably custom configured for the given institution/organization/facility.

Figure 3:
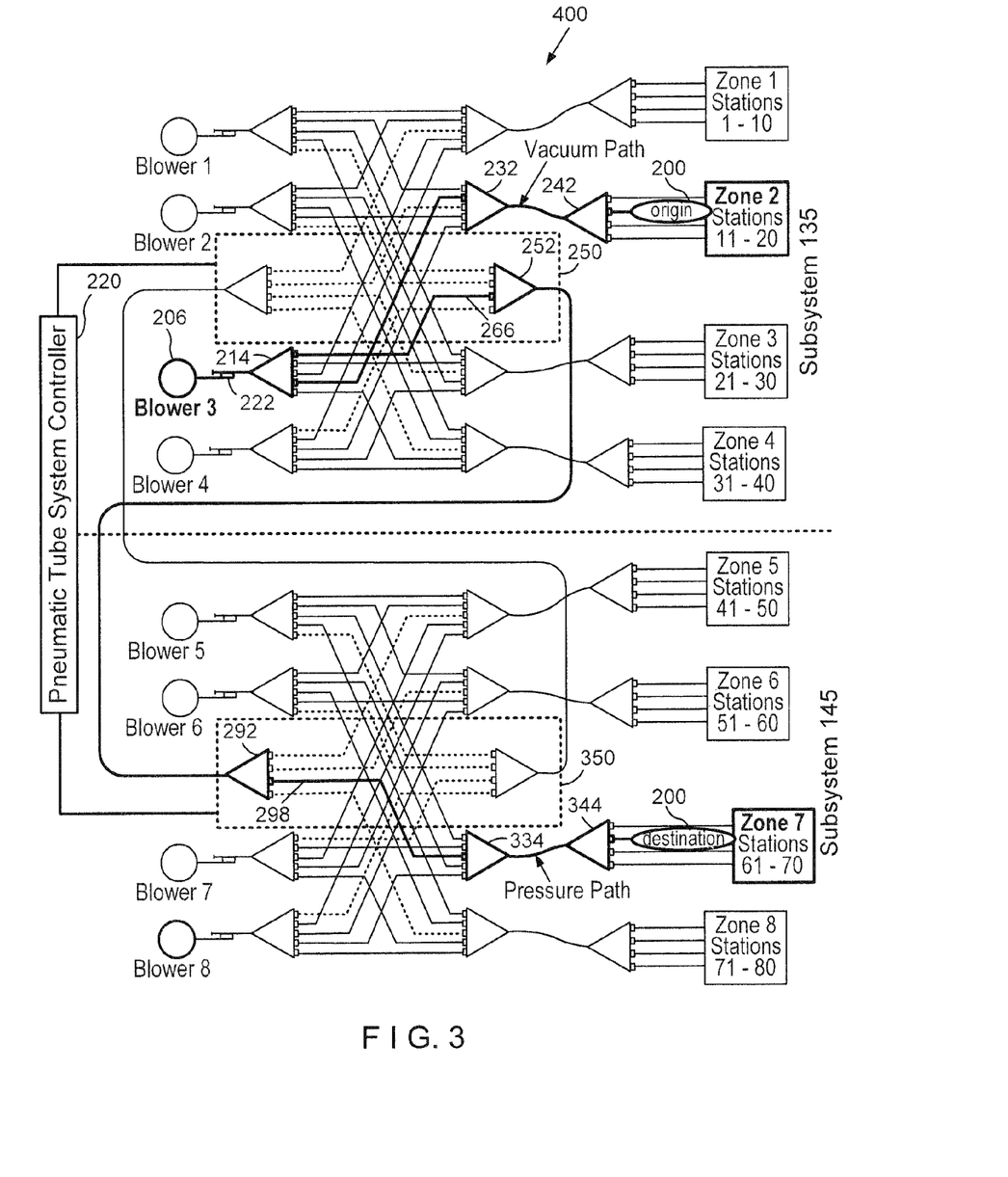
FIG. 3 shows an exemplary path from a sending workstation within a first subsystem to a receiving workstation within a second subsystem of the multiple subsystem pneumatic tube delivery system according to an exemplary embodiment.

FIG. 3 shows an exemplary path from a sending workstation within subsystem 135 to a receiving workstation within subsystem 145 of the multiple subsystem pneumatic tube delivery system 400 according to an exemplary embodiment. As noted above, the exemplary system 400 may allow for any one blower to complete the entire transfer of the carrier 200 from the sending workstation to the receiving workstation. According to the specific path illustrated in FIG. 3, within subsystem 135, the system controller 220 has initially configured zone diverter 242, subsystem diverter 232, and blower diverter 214 and has controlled operation of blower 206 to draw the carrier 200 from the sending workstation to the blower 206. When the carrier 200 has received the blower 206, the controller 220 configures the blower diverter 214, the inter-subsystem diverter 252 of inter-subsystem hub 250 and, within subsystem 145, configures the inter-subsystem diverter 292, the subsystem diverter 334 and the zone diverter 344 to create a path to the receiving workstation. The controller 220 then controls operation of the blower 206 to provide positive pressure to propel the carrier 200 to the receiving workstation.

In the event that any one of the designated blower 206 of subsystems 135 is down (e.g, due to maintenance, mechanical error, or otherwise unavailable), the system controller 220 may select any other blower to perform the transaction. Due to the configuration of the inter-subsystem hubs 250 and 350, the alternative blower may be selected from any of the other blowers in subsystem 135 or any blower in subsystem 145. Thus, the exemplary system eliminates dependency on any one blower and allows for workload to be more evenly distributed among all blowers during operation. Accordingly, the blower redundancy and workload distribution will allow for improved overall performance of the system as well as improved system reliability.

As depicted in FIG. 3, an exemplary carrier 200 traverses a first vacuum path from the sending workstation to the blower and a second positive pressure path from the blower to the receiving workstation as detailed by the arrows along the highlighted vacuum/pressure path within system. The sending workstation is located in a first zone (e.g., Zone 2) of a first subsystem 135, and the receiving workstation is located in a second zone (e.g., Zone 7) of a second subsystem 145.

The selected blower 206 within subsystem 135 applies a vacuum, or negative pressure, to the carrier 200 at the sending workstation to move the carrier 200 from the sending workstation (e.g., one of workstations 11-20 of Zone 2) to the zone diverter 242. The multiple inlet port of the zone diverter 242 is configured by the system controller 220 to direct the carrier 200 along an appropriate path toward the selected blower 206. More specifically, the inlet port of the zone diverter 242 is connected to an upstream subsystem diverter 232, which is configured to direct the carrier to an outlet port connected via tubing to an outlet port of the blower diverter 214 which passes the carrier 200 toward the blower 206. The blower diverter 214 receives the carrier 200 from the subsystem diverter 232 and transfers the carrier 200 to a holding area 222 of the blower 206. In other words, by applying vacuum pressure to the carrier, the blower 206 draws the carrier 200 through the zone diverter 242, through the upstream subsystem diverter 232, through the blower diverter 214 and into the holding area 222 of the blower 206.

Each of the blowers of subsystem 135 according to this embodiment includes a holding area similar to the holding area 222 of blower 206 to retain carriers while the blower transitions from negative pressure to positive pressure. Accordingly, once the carrier 200 reaches the holding area 222 of the blower 206, the blower 206 reverses the direction to apply positive pressure to the carrier 200 propelling the carrier 200 through the blower diverter 214 which has been reconfigured to direct the carrier 200 to the inter-subsystem diverter 252 along tubing 266. The carrier 200 travels from the inter-subsystem diverter 252 to the inter-subsystem hub 350 of the subsystem 145 where it reaches the inter-subsystem diverter 292 which has been configured by the controller 220 to direct the carrier 200 to the subsystem diverter 334 which passes the carrier to the zone diverter 344. The zone diverter 344 has been configured by the controller 220 to direct the carrier 200 to the receiving workstation within destination Zone 7.

Figure 4A:
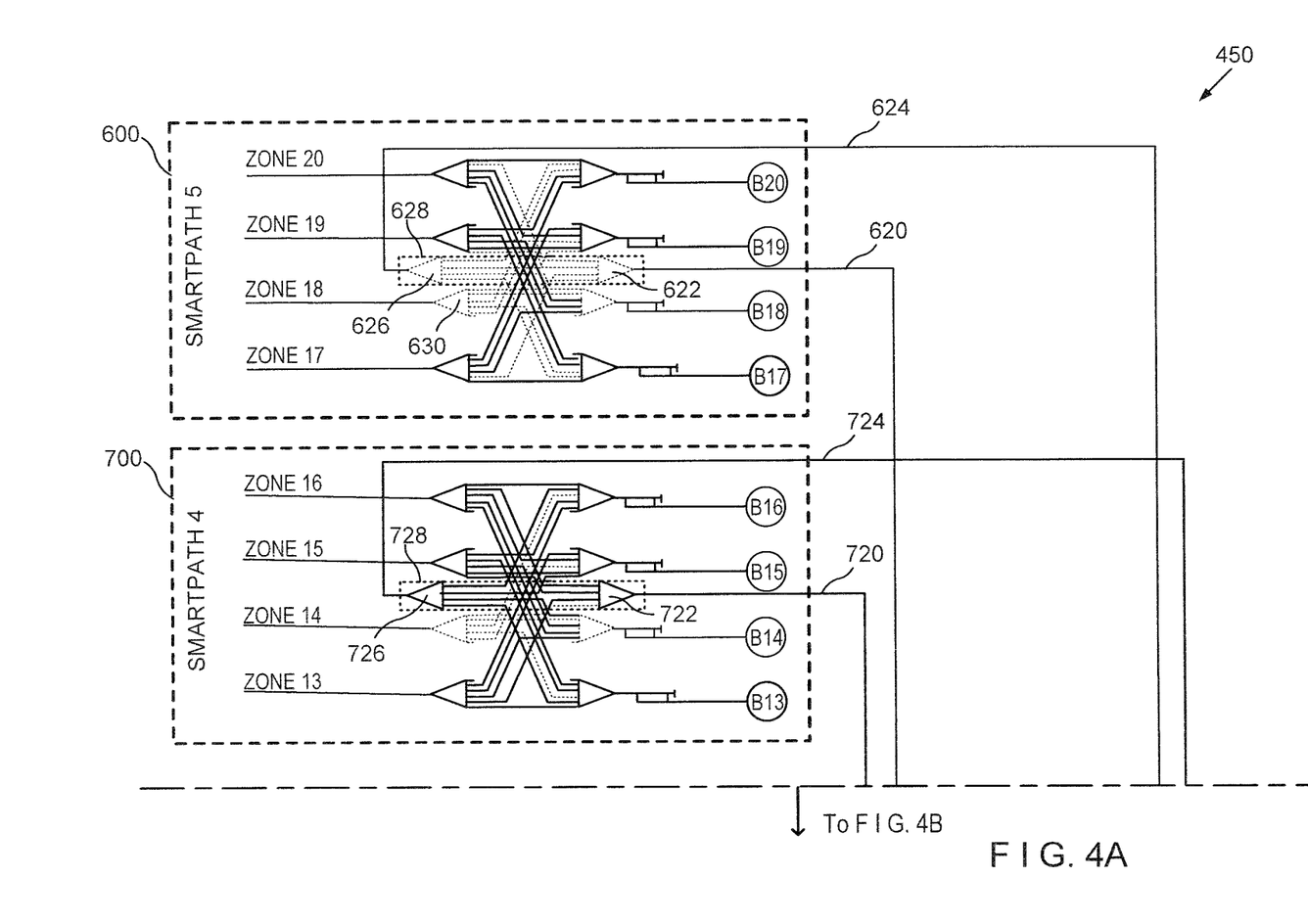
FIGS. 4A, 4B, and 4C show schematic diagram of a pneumatic tube delivery system having five subsystems and a controller according to an exemplary embodiment.
Figure 4B:
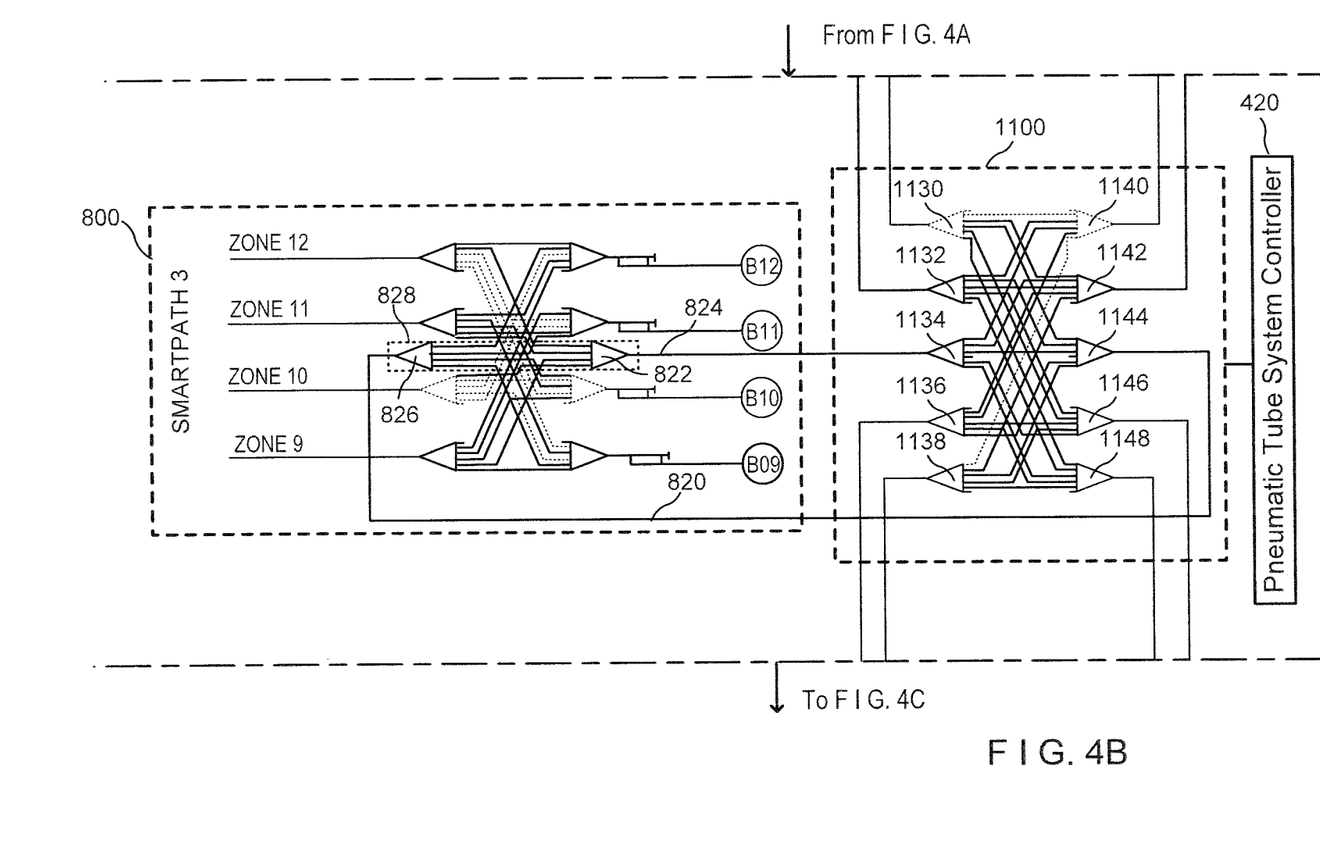
Figure 4C:
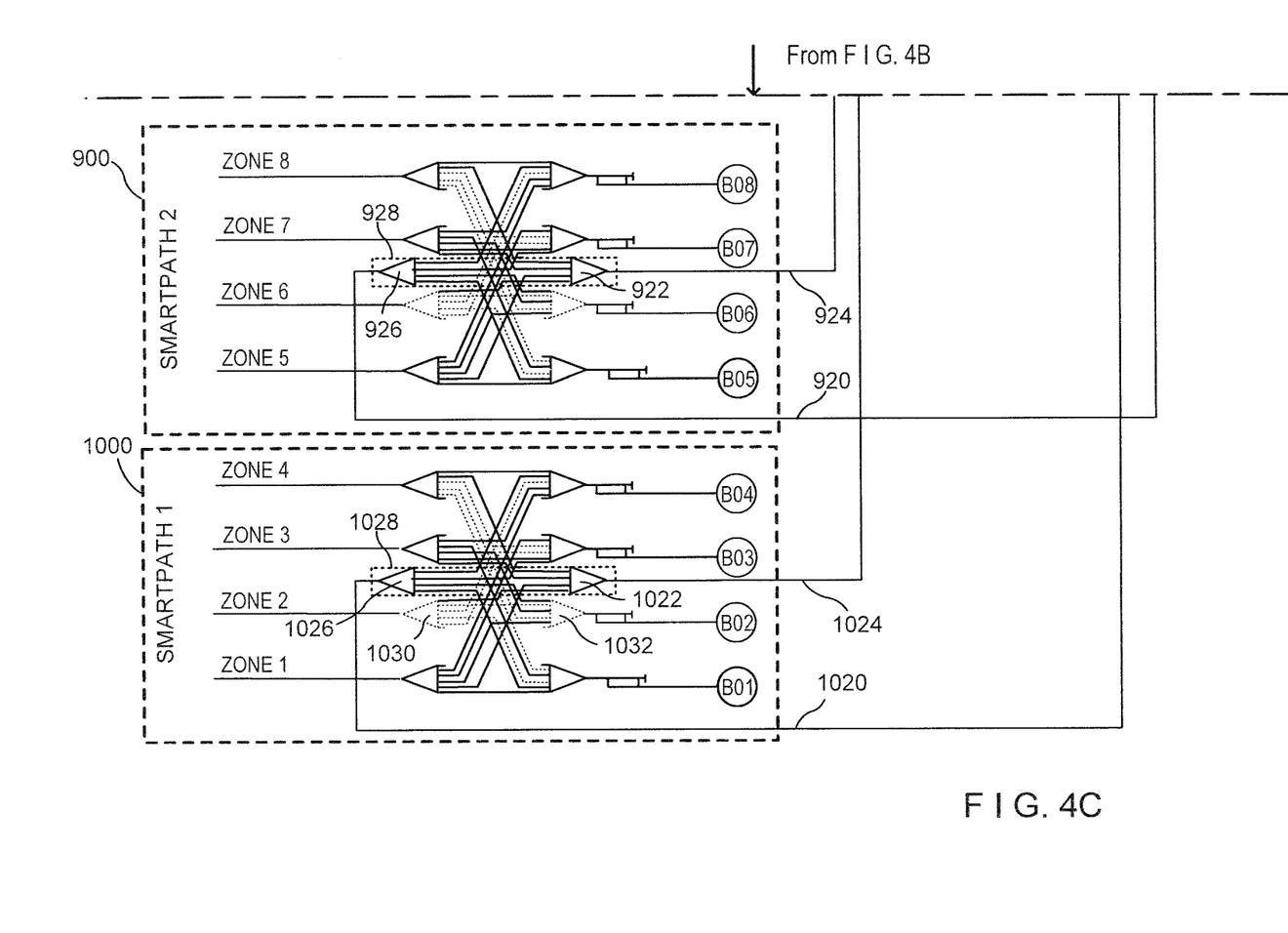

FIGS. 4A, 4B, and 4C show schematic diagram of the pneumatic tube delivery system 450 having five subsystems 600, 700, 800, 900 and 1000 and a controller 420 according to an exemplary embodiment. Those skilled in the art will understand that the controller 420 may operate in a manner substantially similar to the controller 220 described above in regard to the system 100. That is, the controller 420 will receive delivery information and system to control operation of all of the components of the system described below to deliver carriers 200 between the workstations with each delivery utilizing only a single blower. As shown in FIGS. 4A, 4B, and 4C, each of the subsystems 600, 700, 800, 900 and 1000 includes a inter-subsystem hub 628, 728, 828, 928 and 1028, wherein each inter-subsystem hub 628, 728, 828, 928 and 1028 includes a plurality of inter-subsystem diverters 622/626, 722/726, 822/826, 922/926 and 1022/1026, respectively, connected similarly to the blower diverters and the subsystem diverters of their respective subsystems as described above in regard to the inter-subsystem diverters 252, 270, 292 and 282 of FIG. 2. However, to interconnect each of the five subsystems 600, 700, 800, 900 and 1000, instead of directly connecting the inlet of any of the inter-subsystem diverters directly to the inlet of an inter-subsystem diverter of another subsystem as in FIG. 2, the inlets of each of the inter-subsystem diverters of all five subsystems are connected to an inter-subsystem exchange component 1100. The inter-subsystem exchange component 1100 includes a plurality of exchange diverters 1130, 1132, 1134, 1136, 1138, 1140, 1142, 1144, 1146 and 1148—a pair of exchange diverters for each of the subsystems in the pneumatic tube delivery system. As there are five interconnected subsystems within the system, the inter-subsystem exchange component 1100 includes a five pairs of exchange diverters.

According to the exemplary embodiment illustrated in FIGS. 4A, 4B, and 4C, the inter-subsystem hub 628 of subsystem 600 is connected to the inter-subsystem exchange component 1100 via tubing 620 and 624. Specifically, the inlet port of the first inter-subsystem diverter 622 of the inter-subsystem hub 628 communicates with the inter-subsystem exchange component 1100 via tubing 620 that extends to the inlet port of the exchange diverter 1130 while the inlet port of the second inter-subsystem diverter 626 is connected via tubing 624 with the inlet port of the exchange diverter 1140. The inlet ports of each pair of inter-subsystem diverters in each of the other zones are similarly connected to the inlet ports of a corresponding pair of exchange diverters. The exchange diverters form a first bank including, in this embodiment, five exchange diverters each of whose inlet ports is coupled to the inlet port of a first inter-subsystem diverter of a corresponding one of the subsystems with the outlet ports of each of the first inter-subsystem diverters being coupled to the outlet ports of each of the blower diverters of the corresponding subsystem. Thus this first bank of exchange diverters (1130, 1132, 1134, 1136 and 1138) is connectable via a direct path to each blower in all the subsystems. The remaining five exchange diverters (1140, 1142, 1144, 1146 and 1148) form a second bank with the inlet of each of the exchange diverters in this second bank being connected to a second inter-subsystem diverter in a corresponding one of the subsystems. As the outlet ports of the second inter-subsystem diverters in each subsystem are connected to the outlet ports of each of the subsystem diverters of the subsystem (which in turn are connected to the zone diverters) the second bank of exchange diverters can be directly coupled to any of the zone diverters and, consequently, to any work station. The outlet ports of each of the exchange diverters of the first bank are connected to each of the exchange diverters of the second bank enabling a connection between any work station of any zone with any of the blowers of any zone. As any blower can be connected, via the inter-subsystem exchange component 1100 to any workstation, any transaction between any workstations in any subsystems can be handled by any one of the blowers in the system. This provides tremendous flexibility to the system and is scalable nearly infinitely by, for example, adding additional diverters between the first and second banks of exchange diverters to increase the number of connections that can be made therebetween.

Likewise, in each of the other subsystems 700, 800, 900 and 1000, the respective inter-subsystem hubs 728, 828, 928 and 1028 are connected to the inter-subsystem exchange component 1100 via respective tubing 720/724, 820/824, 920/924 and 1020/1124. Specifically, the first inter-subsystem diverter 722 of the inter-subsystem hub 728 is in communication with the inter-subsystem exchange component 1100 via tubing 720, and the second inter-subsystem diverter 726 of the inter-subsystem hub 728 is in communication with the inter-subsystem exchange component 1100 via tubing 724. The first inter-subsystem diverter 822 of the inter-subsystem hub 828 is in communication with the inter-subsystem exchange component 1100 via tubing 820, and the second inter-subsystem diverter 826 of the inter-subsystem hub 828 is in communication with the inter-subsystem exchange component 1100 via tubing 824. The first inter-subsystem diverter 922 of the inter-subsystem hub 928 is in communication with the inter-subsystem exchange component 1100 via tubing 920, and the second inter-subsystem diverter 926 of the inter-subsystem hub 928 is in communication with the inter-subsystem exchange component 1100 via tubing 924. The first inter-subsystem diverter 1022 of the inter-subsystem hub 1028 is in communication with the inter-subsystem exchange component 1100 via tubing 1020, and the second inter-subsystem diverter 1026 of the inter-subsystem hub 1028 is in communication with the inter-subsystem exchange component 1100 via tubing 1024.

Figure 5:
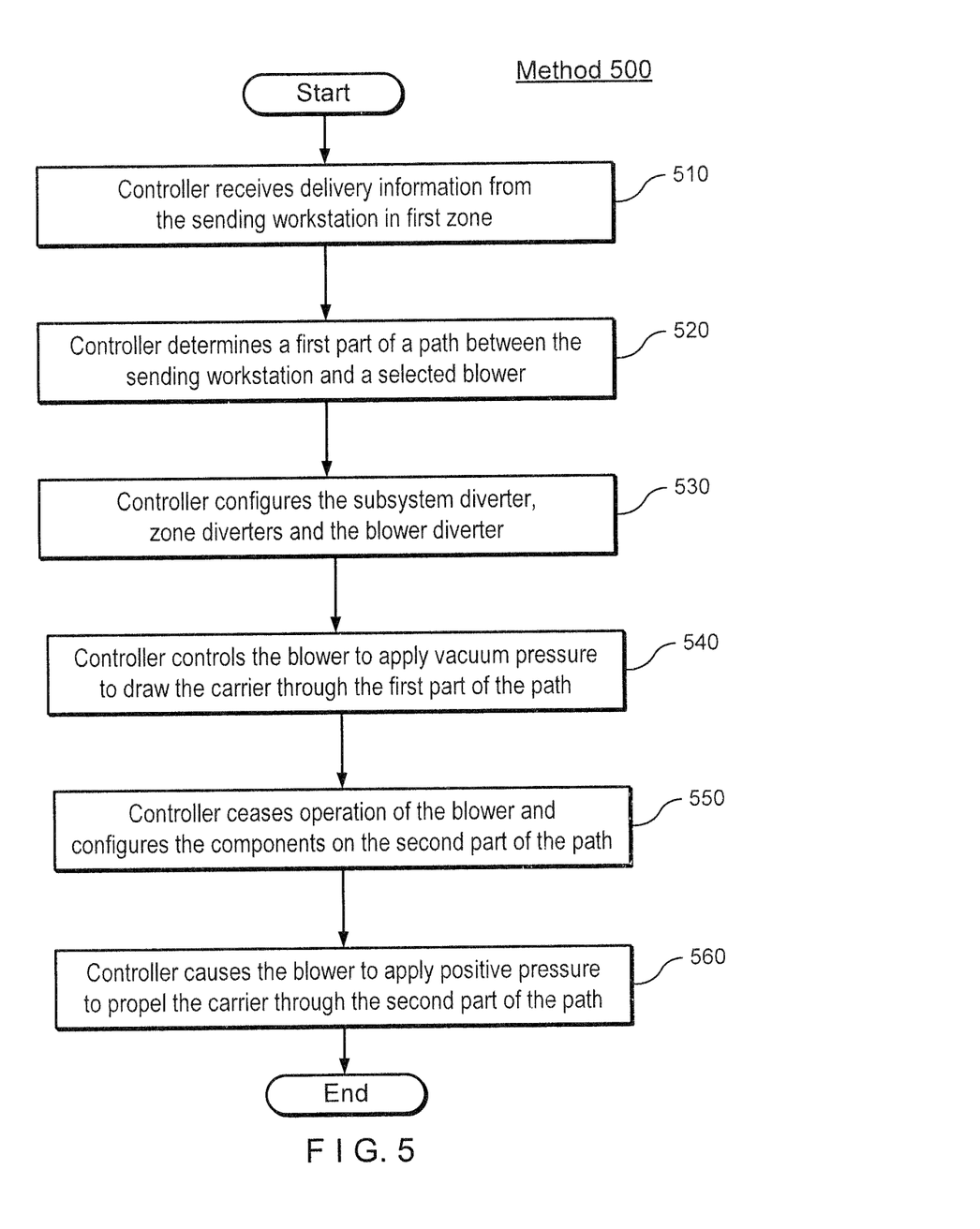
FIG. 5 shows a flow diagram of a method according to an exemplary embodiment of the present invention.

A method of operation of the system will now be described with reference to the system depicted in FIGS. 4A, 4B, and 4C and the flow diagram of FIG. 5. The method 500 will be described in regard to the delivery of a carrier 200 from a workstation in zone 2 of subsystem 1000 to a workstation in zone 18 of subsystem 600. FIG. 5 shows an exemplary method 500 carried out by the system 450 implemented in accordance with an exemplary embodiment for illustrative general reference.

In a step 510, the controller 420 receives delivery information from the sending workstation in zone 2 of subsystem 1000 for the delivery of a carrier 200 to specific workstation in zone 18 of subsystem 600. As noted above, the sending workstation may include an information reader with a user interface or any other device for gathering delivery information corresponding to the carrier 200 and its contents. For instance, the information reader may include an manual information reader for user input and/or an automatic information reader, such as, but not limited to, an optical scanner (e.g., barcode reader, image reading camera, etc.), a short-range wireless transceiver (e.g., a radio-frequency identification ("RFID") reader, a Bluetooth-enabled component, etc.), etc. In step 520, the controller 420 determines a first part of a path between the sending workstation and a selected blower (e.g., blower B02 in subsystem 1000). In step 530, the controller 420 configures the subsystem diverter 1030 (and any zone diverters between the sending workstation and the diverter 1030) to the blower diverter 1032 associated with the blower B02 and configures the blower diverter 1032 to couple its outlet port that is connected to the subsystem diverter 1030 to the blower B02.

When the first part of the path has been completely configured, in step 540 the controller 420 controls the blower B02 to apply vacuum pressure to draw the carrier 200 through the first part of the path to the blower B02. Then, in step 550, the controller 420 ceases operation of the blower B02 and configures the components on the second part of the path extending from the blower B02 to the receiving workstation in zone 18 of subsystem 600. The blower diverter 1032 is configured to couple the blower B02 to the outlet port of the diverter 1032 which is coupled to an outlet port of the inter-subsystem diverter 1028 and the inter-subsystem diverter 1028 is configured to couple the selected outlet port to its inlet port which is coupled to the inlet port of exchange diverter 1148 via tube 1020. The exchange diverter 1148 is configured to couple its inlet port to its outlet port that is connected to an outlet port of exchange diverter 1130 which has been configured to connect this outlet port to its inlet port which is connected to the inlet port of inter-subsystem diverter 622 via tube 620. The inter-subsystem diverter 622 is configured to connect its inlet port to the outlet port which is coupled to an outlet port of the subsystem diverter 630 which has been configured to couple this outlet port to its inlet port. The controller 420 then configures any zone diverters downstream of the subsystem diverter 630 to complete the path from the blower B02 to the receiving workstation in zone 18.

Then, in step 560, the controller 420 causes the blower B02 to apply positive pressure to propel the carrier 200 through the second part of the path to the receiving workstation in zone 18. Of course, as described above, it will be understood that the path determined by and the timing of operations directed by the controller 420 take into account the delivery information (including urgency data for this carrier and others in the system), and system information (e.g., system traffic and component availability), etc.

Those skilled in the art will understand that the above-described exemplary embodiments may be implemented in any number of manner, including as a separate software module, as a combination of hardware and software, etc. For example, the system controller 120 may be programs containing lines of code that, when compiled, may be executed on a processor.

Although these embodiments have been described in connection with specific forms and steps, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention.

What is claimed is:

1. A pneumatic delivery system comprising:
a network of pneumatic tubing connecting a plurality of workstations organized in a plurality of subsystems and including a plurality of blowers for propelling items between the workstations via the network of tubing;
a first plurality of the blowers and a corresponding plurality of first blower diverters organized in a first subsystem with each of the first blowers coupled to an inlet tube of a corresponding one of the first blower diverters, an inter-subsystem outlet of each of the first blower diverters being coupled to a corresponding outlet of a first inter-subsystem blower side diverter;
a first plurality of workstation diverters, each of the first workstation diverters including a plurality of outlets, an inter-subsystem outlet of each of the first workstation diverters being coupled to a corresponding outlet of a first inter-subsystem workstation side diverter, an inlet of each of the first workstation diverters being connected to at least one work station of the first subsystem;
a second plurality of the blowers and a corresponding plurality of second blower diverters organized in a second subsystem with each of the second blowers coupled to an inlet tube of a corresponding one of the second blower diverters, an inter-subsystem outlet of each of the second blower diverters being coupled to a corresponding outlet of a second inter-subsystem blower side diverter;
a second plurality of workstation diverters, each of the second workstation diverters including a plurality of outlets, an inter-subsystem outlet of each of the second workstation diverters being coupled to a corresponding outlet of a second inter-subsystem workstation side diverter, an inlet of each of the second workstation diverters being connected to at least one work station of the second subsystem; and
an inter-subsystem exchange unit including first and second pluralities of exchange diverters, each of the first exchange diverters having an inlet coupled to an inlet of a corresponding one of the first and second inter-subsystem blower side diverters, each of the second exchange diverters having an inlet coupled to an inlet of a corresponding one of the first and second inter-subsystem workstation side diverters, each of the first exchange diverters having an outlet coupled to a corresponding outlet of each of the second exchange diverters.

2. The pneumatic delivery system of claim 1, comprising a controller receiving delivery information corresponding to each item to be delivered and, for each item to be sent, determining a path between a sending workstation from which the item is to be sent and a receiving workstation to which the item is to be delivered and configuring diverters along the path and operating a selected blower to deliver the item from the sending workstation to the receiving workstation.

3. The pneumatic delivery system of claim 2, wherein the delivery information is received from an automatic information reader at the sending workstation.

4. The pneumatic delivery system of claim 2, wherein for every combination of the sending workstation and the receiving workstation, the controller delivers the item using only a single blower.

5. The pneumatic delivery system of claim 2, wherein the delivery information includes one of an identification of a receiving workstation, a transaction priority, a preferred routing, an alert, access permissions, location restrictions, time of day restrictions, control software graphical user interface messages and error handling preferences.

6. The pneumatic delivery system of claim 1, further comprising:
a third plurality of the blowers and a corresponding plurality of third blower diverters organized in a third subsystem with each of the third blowers coupled to an inlet tube of a corresponding one of the third blower diverters, an inter-subsystem outlet of each of the third blower diverters being coupled to a corresponding outlet of a third inter-subsystem blower side diverter; and
a third plurality of workstation diverters, each of the third workstation diverters including a plurality of outlets, an inter-subsystem outlet of each of the third workstation diverters being coupled to a corresponding outlet of a third inter-subsystem workstation side diverter, an inlet of each of the third workstation diverters being connected to at least one work station of the third subsystem.

7. The pneumatic delivery system of claim 6, wherein each of the first exchange diverters has an inlet coupled to an inlet of the third inter-subsystem blower side diverter, each of the second exchange diverters having an inlet coupled to an inlet of the third inter-subsystem workstation side diverter.

8. A method for delivering items in a pneumatic delivery system, comprising:
receiving delivery information corresponding to an item to be delivered from a first workstation of a plurality of workstations to a second one of the workstations;
configuring a first one of a plurality of blowers and a corresponding workstation diverter corresponding to the first workstation to create a path from the first workstation to the first blower;
operating the first blower to generate suction drawing the item to the first blower;
configuring a subset of a plurality of diverters of the system to create a continuous path from the first blower to the second workstation; and
routing, when the first workstation is in a first subsystem and the second workstation is in a second subsystem of the pneumatic delivery system, the item through an inter-subsystem exchange unit so that the item is delivered to the second workstation using only the first blower, the inter-subsystem exchange unit including first and second pluralities of exchange diverters, each of the first exchange diverters having an inlet coupled to an inlet of a corresponding one of a first and a second inter-subsystem blower side diverter, each of the second exchange diverters having an inlet coupled to an inlet of a corresponding one of a first and a second inter-subsystem workstation side diverter, each of the first exchange diverters having an outlet coupled to a corresponding outlet of each of the second exchange diverters.

9. The method of claim 8, further comprising:
configuring at least one of the exchange diverters of the inter-subsystem exchange unit based on the delivery information to provide a pathway from the first subsystem to the second subsystem.

10. The method of claim 8, wherein a controller receives the delivery information corresponding to each item to be delivered and, for each item to be sent, determining the path between the first workstation from which the item is to be sent and the second workstation.

11. The method of claim 10, wherein for every combination of the first workstation and receiving workstation, the controller delivers the item using only the first blower.

12. The method of claim 8, wherein the delivery information is received from an automatic information reader at the sending workstation.

13. The method of claim 8, wherein the delivery information includes one of an identification of a receiving workstation, a transaction priority, a preferred routing, an alert, access permissions, location restrictions, time of day restrictions, control software graphical user interface messages and error handling preferences.

14. An exchange unit for delivering items within a pneumatic delivery system including a plurality of subsystems, the exchange unit comprising:
   transmission tubing coupling a first subsystem of the plurality of subsystems to a second subsystem of the plurality of subsystems via the exchange unit, each of the first and second subsystems including a plurality of blowers and corresponding blower diverters, a plurality of workstations and corresponding workstation diverters, blower-side inter-subsystem diverters and workstation-side inter-subsystem diverters;
   a plurality of first exchange diverters having exchange inlets coupled to inlets of the blower-side inter-subsystem diverters of each of the first and second subsystems; and
   a plurality of second exchange diverters having an inlet coupled to an inlet of a corresponding one of the first and second inter-subsystem workstation side diverters, each of the first exchange diverters having an outlet coupled to a corresponding outlet of each of the second exchange diverters.

15. The exchange unit of claim 14, wherein a controller receiving delivery information corresponding to each item to be delivered and, for each item to be sent, configures the plurality of exchange diverters to generate a path between a sending workstation from which the item is to be sent and a receiving workstation to which the item is to be delivered.

16. The exchange unit of claim 15, wherein the delivery information is received from an automatic information reader at the sending workstation.

17. The exchange unit of claim 15, wherein for every combination of the sending workstation and the receiving workstation, the controller delivers the item using only a single blower via the exchange unit.

18. The exchange unit of claim 15, wherein the delivery information includes one of an identification of a receiving workstation, a transaction priority, a preferred routing, an alert, access permissions, location restrictions, time of day restrictions, control software graphical user interface messages and error handling preferences.

19. The exchange unit of claim 14, wherein the transmission tubing couples to a third subsystem including a further plurality of blowers and corresponding further blower diverters, a further plurality of workstations and further corresponding workstation diverters, further blower-side inter-subsystem diverters and further workstation-side inter-subsystem diverters.

20. The exchange unit of claim 14, wherein each of the first exchange diverters has an inlet coupled to an inlet of the third inter-subsystem blower side diverter, each of the second exchange diverters having an inlet coupled to an inlet of the third inter-subsystem workstation side diverter.

\* \* \* \* \*